United States Patent
Ginchereau et al.

(10) Patent No.: US 7,715,395 B2
(45) Date of Patent: May 11, 2010

(54) SYSTEM AND METHOD FOR EXPANDING THE RANGE OF A MESH NETWORK

(75) Inventors: Jason Earl Ginchereau, Redmond, WA (US); Jeff Baird Erwin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 10/997,318

(22) Filed: Nov. 24, 2004

(65) Prior Publication Data
US 2006/0120370 A1    Jun. 8, 2006

(51) Int. Cl.
*H04L 12/28* (2006.01)
*H04L 12/56* (2006.01)
(52) U.S. Cl. ......................... 370/392; 370/400; 709/238
(58) Field of Classification Search ................. 370/352, 370/392, 409, 351, 400, 401, 408, 463
See application file for complete search history.

(56) References Cited

U.S. PATENT DOCUMENTS

| | | | |
|---|---|---|---|
| 6,122,743 A * | 9/2000 | Shaffer et al. ................. | 726/3 |
| 6,473,405 B2 * | 10/2002 | Ricciulli ...................... | 370/238 |
| 6,728,232 B2 | 4/2004 | Hasty et al. .................. | 370/338 |
| 6,791,949 B1 | 9/2004 | Ryu et al. .................... | 370/254 |
| 6,836,463 B2 * | 12/2004 | Garcia-Luna-Aceves et al. .......................... | 370/238 |

(Continued)

OTHER PUBLICATIONS

Office Action mailed Nov. 28. 2007, U.S. Appl. No. 10/996,769 filed Nov. 24, 2004. entitled "System and Method for Using a Hop Limited Cast for Internet Egress Point Selection".

(Continued)

*Primary Examiner*—William Trost, IV
*Assistant Examiner*—Roberta A Shand
(74) *Attorney, Agent, or Firm*—Merchant & Gould; Ryan T. Grace

(57) ABSTRACT

A system and method of expanding the range of a mesh network by determining whether a route through a local Internet service provider is an optimal path between two nodes. If the route through a local Internet service provider is an optimal path, a routing table is updated to include the optimal path so that mesh nodes on the mesh network have access to the routing table.

20 Claims, 6 Drawing Sheets

U.S. PATENT DOCUMENTS

| | | | |
|---|---|---|---|
| 6,842,462 B1 * | 1/2005 | Ramjee et al. | 370/466 |
| 6,965,575 B2 | 11/2005 | Srikrishna et al. | 370/252 |
| 6,965,937 B2 * | 11/2005 | Gaddis et al. | 709/227 |
| 6,982,966 B2 | 1/2006 | Eidenschink et al. | 370/252 |
| 7,058,021 B2 | 6/2006 | Srikrishna et al. | 370/252 |
| 7,085,241 B1 * | 8/2006 | O'Neill et al. | 370/254 |
| 7,099,286 B1 | 8/2006 | Swallow | 370/255 |
| 7,099,944 B1 * | 8/2006 | Anschutz et al. | 709/227 |
| 7,111,163 B1 * | 9/2006 | Haney | 713/153 |
| 7,251,238 B2 | 7/2007 | Joshi et al. | 370/338 |
| 7,263,070 B1 | 8/2007 | Delker et al. | 370/254 |
| 7,280,483 B2 | 10/2007 | Joshi | 370/238 |
| 7,283,529 B2 * | 10/2007 | Basso et al. | 370/392 |
| 7,315,548 B2 | 1/2008 | Joshi | 370/401 |
| 7,376,087 B2 | 5/2008 | Srikrishna | 370/238 |
| 7,382,759 B2 | 6/2008 | Joshi et al. | 370/338 |
| 7,394,756 B1 * | 7/2008 | Cook | 370/216 |
| 2001/0036161 A1 | 11/2001 | Eidenschink et al. | 370/316 |
| 2002/0176414 A1 * | 11/2002 | Miki et al. | 370/389 |
| 2003/0117954 A1 * | 6/2003 | De Neve et al. | 370/230 |
| 2003/0137930 A1 | 7/2003 | Futernik | 370/216 |
| 2003/0179742 A1 | 9/2003 | Ogier et al. | 370/351 |
| 2003/0204619 A1 * | 10/2003 | Bays | 709/238 |
| 2004/0128345 A1 | 7/2004 | Robinson et al. | 709/203 |
| 2004/0148520 A1 * | 7/2004 | Talpade et al. | 713/201 |
| 2005/0047348 A1 * | 3/2005 | Suzuki et al. | 370/252 |
| 2005/0207411 A1 * | 9/2005 | Ota et al. | 370/389 |

OTHER PUBLICATIONS

Office Action mailed Jan. 11, 2008. U.S. Appl. No. 11/000,232 filed, Nov. 29, 2004, entitled "System and Method for Dynamic Egress Routing Through a Single Default Gateway in a Mesh Network".
Official Action in U.S. Appl. No. 11/000,232 dated Aug. 1, 2008.

* cited by examiner

SYSTEM AND METHOD FOR EXPANDING THE RANGE OF A MESH NETWORK

CROSS-REFERENCE TO RELATED APPLICATIONS

The present invention is related to a patent application Ser. No. 11/000,232, entitled: "System and Method for Dynamic Egress Routing Through a Single Default Gateway on a Mesh Network", filed concurrently with this application. The present invention is also related to a patent application Ser. No. 10/996,769, entitled: "System and Method for Using a Hop Limited Cast for Internet Egress Point Selection", filed concurrently with this application. The related applications are assigned to the assignee of the present patent application and are hereby incorporated by reference.

BACKGROUND OF THE INVENTION

Wireless communication between devices is becoming a more prevalent and accepted method of providing network communication. Wireless communication may take place on a mesh network comprised of mesh boxes or mesh-configured computing devices referred to as mesh nodes. A mesh network is a network topology in which mesh nodes are connected by self-forming connections as mesh nodes enter the network. In a large-scale well-connected mesh network, users expect to access any part of the mesh network from any other part of the mesh. Stated another way, users want to access the same resources from their desktop at home, from their laptop, from a coffee shop, from a kiosk at the library, or from a tablet at school. Assuming all the locations are connected to the same mesh network, this expectation of connectivity is reasonable.

Wireless communication, however, may have several limitations that affect communication on a mesh network. These limitations may arise from the routing protocol of the mesh network. In order to communicate information between two distant mesh nodes, mesh nodes route through intermediate mesh nodes. One segment of a route, comprising a direct path from one node to another, is generally referred to as a hop. For example, if a data packet must traverse two intermediate mesh nodes before reaching a destination mesh node, the data packet will make three hops. Also, a data packet may have several paths through the mesh available for routing. Each of the several paths may have different connectivity. For example, one path may require a data packet to make eight hops while another path may only require two hops. In general, as hops on the mesh increase, latency increases; hence, the communication path between two mesh nodes cannot practically scale beyond a limited number of hops before connectivity falls below user expectations. Accordingly, there exists a need to identify the best path through a mesh network in order to maximize performance for devices communicating on a mesh network. The best path is commonly the path with the fewest number of hops, but that is not always the case; an intelligent routing algorithm can also take into account other performance factors such as latency, bandwidth, and reliability. There also exists a need to expand the range of communication on a mesh network so that distant mesh nodes may effectively communicate on the mesh network.

SUMMARY OF THE INVENTION

Aspects of the present invention relate to a system and method of expanding the range of a mesh network by providing an alternative path through a mesh network that requires data to make fewer hops to reach its destination. One aspect of the present invention is a computer-implemented method that includes determining whether a route through a local Internet service provider is an optimal path between two mesh nodes. The method also includes updating a routing table to include the optimal path.

Another aspect of the present invention is a computer-readable medium that includes computer-executable instructions for obtaining a description of a route through a local Internet service provider. The instructions also include determining if the description indicates that the route through the local Internet service provider is optimal and if so, updating a routing table to include the optimal route.

Yet another aspect of the present invention includes a system that has a mesh network with access to an Internet service provider. The system also has a first mesh node configured to transmit data through the Internet service provider without the data entering the Internet. The system further includes a second mesh node configured to receive the data after being transmitted through the Internet service provider.

Still another aspect of the present invention is a system that includes a mesh node having access to computer readable instructions for updating a routing table with an optimal path through an Internet service provider. These and other embodiments will be evident as more fully set forth in the detailed description and claims below.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
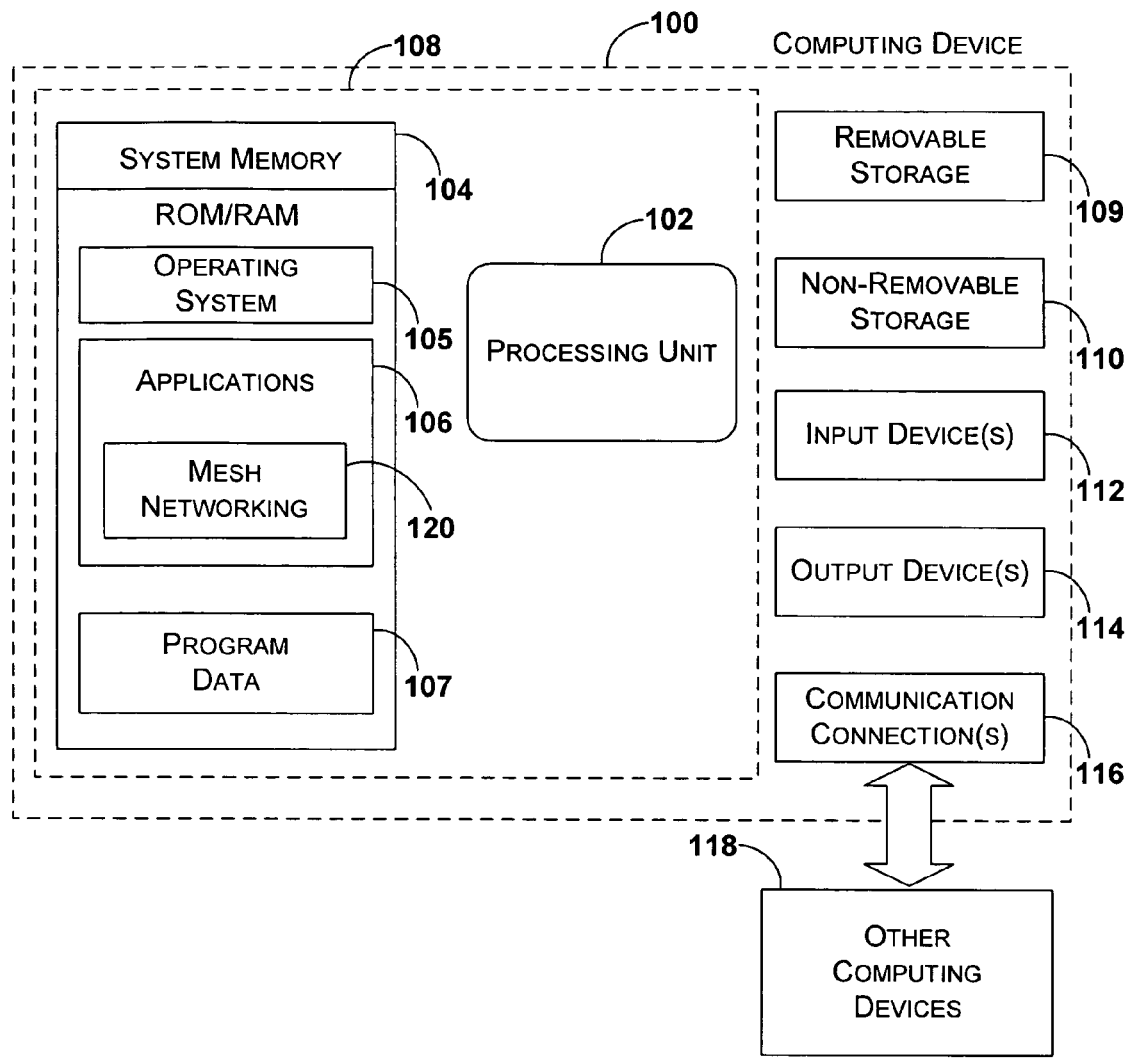
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for implementing mesh networking functionality in accordance with the present invention. The functionality represented by application 120 may be further supported by additional input devices, 112, output devices 114, and communication connection(s) 116 that are included in computing device 100 for establishing and maintaining a mesh network.

Figure 2:
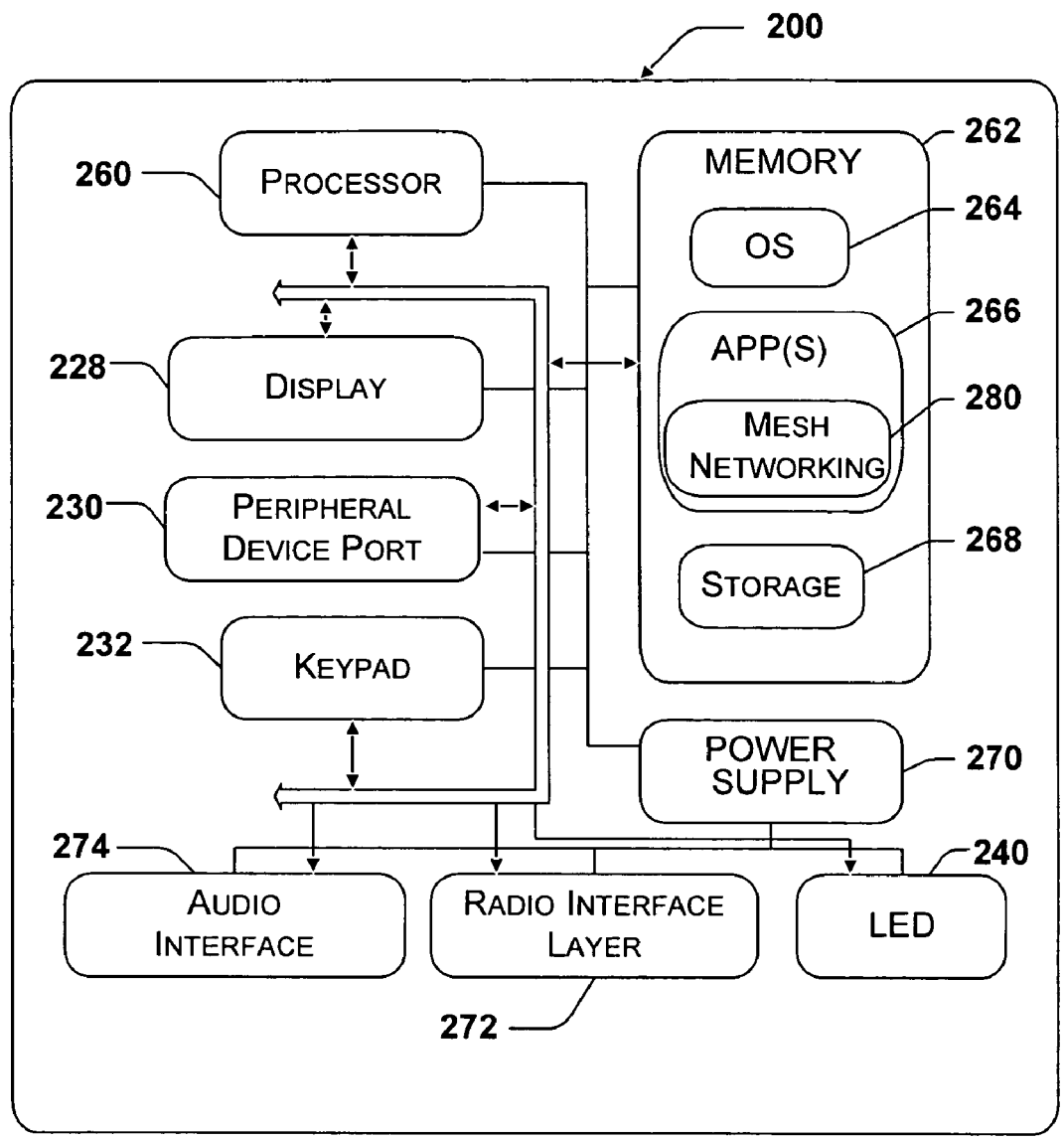
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and optionally a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further include an application 280 for implementing mesh networking functionality in accordance with the present invention. The functionality represented by application 280 may be further supported by structure in radio interface layer 272 that is included in mobile device 200 for establishing and maintaining a mesh network.

Figure 3:
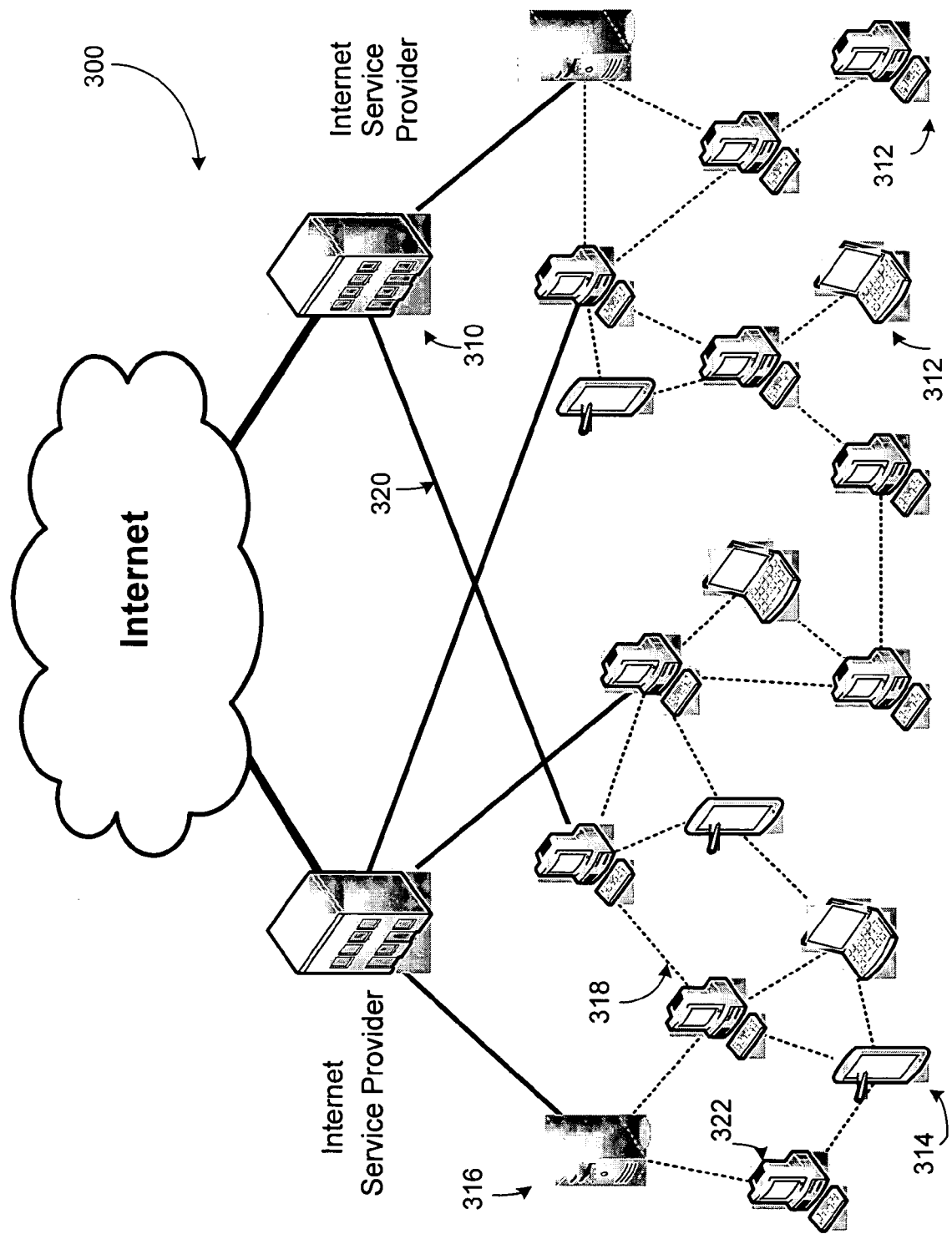
FIG. 3 illustrates an exemplary mesh network that may be used in one exemplary embodiment of the present invention.

FIG. 3 illustrates a mesh network 300 that may be used in one exemplary embodiment of the present invention. Mesh network 300 may comprise any topology of mesh nodes, Internet service providers and communication media. Also, the mesh network 300 may have a static or dynamic topology without departing from the spirit and scope of the present invention.

The mesh network 300 includes one or more Internet service providers 310, which provide Internet access points for one or more mesh nodes. Each mesh node may comprise any device that is connected to the mesh network 300. The mesh node may transmit and receive data packets and also may pass data packets to other mesh nodes in accordance with the routing protocol of the mesh network 300. The mesh node may be a fixed device or a mobile device. For example, the mesh node may include a computing device 312 that is similar to computing device 100 described above in conjunction with FIG. 1. The mesh node may also include a mobile computing device 314 that may be similar to mobile computing device 200 described above in conjunction with FIG. 2. Other embodiments may include other configurations of mesh nodes. For example, a mesh node may include a dedicated computer that only routes data packets from one mesh node to another such as the mesh box 316.

In one exemplary embodiment of the present invention, the mesh network 300 has a network topology in which mesh nodes are connected with several redundant connections between the mesh nodes. The mesh network 300 may include a full mesh where every mesh node is connected to every other mesh node in the mesh network. Mesh network 300 may also include a partial mesh topology where some mesh nodes are organized in a full mesh and other mesh nodes are only connected to one or two other mesh nodes. Other mesh topologies may include one or more subnets connected to the mesh network. These subnets may have a plurality of clients connected thereto. The various topologies for the mesh network 300 are endless and will not be further set forth herein.

Reference number 318 indicates communication media between the mesh nodes. By way of example, and not limitation, communication media 318 may include wired media such as a wired network or direct-wired connection, and wireless media such as acoustic, RF, infrared and other wireless media. Reference number 320 indicates communication media between Internet service provider 310 and one or more of the mesh nodes. The communication media 320 may include wired media such as a wired network or direct-wired connection, and wireless media such as acoustic, RF, infrared and other wireless media.

In the mesh network 300, mesh nodes may transmit and receive data packets from other mesh nodes and/or from the Internet. Routing tables typically determine what path a data packet traverses through the mesh network. The routing of a data packet is commonly determined at a source node. Stated another way, the node sending a data packet may determine the route a data packet takes through the mesh network. A data packet routed from a mesh node to reach another mesh node is typically referred to as a "hop." For example, if mesh node 314 desires to transmit a data packet to mesh node 316, the routing tables accessible to mesh node 314 may indicate routing will take place through mesh node 322. Accordingly, the data packet will make two hops (node 314 to node 322 and node 322 to node 316). In general, latency increases proportionally with the number of hops a data packet must make to reach a mesh node. Also, routing tables may indicate several available paths for a data packet to traverse to reach a destination. Routing tables may also indicate that a destination mesh node is inaccessible because the number of hops is too great. Therefore, it is advantageous for each node to have access to routing tables with the most optimal path between nodes. It is also advantageous for each node to have access to routing tables that provide greater access to the mesh network.

Illustrative Embodiments of Expanding the Range of a Mesh Network

Figure 4:
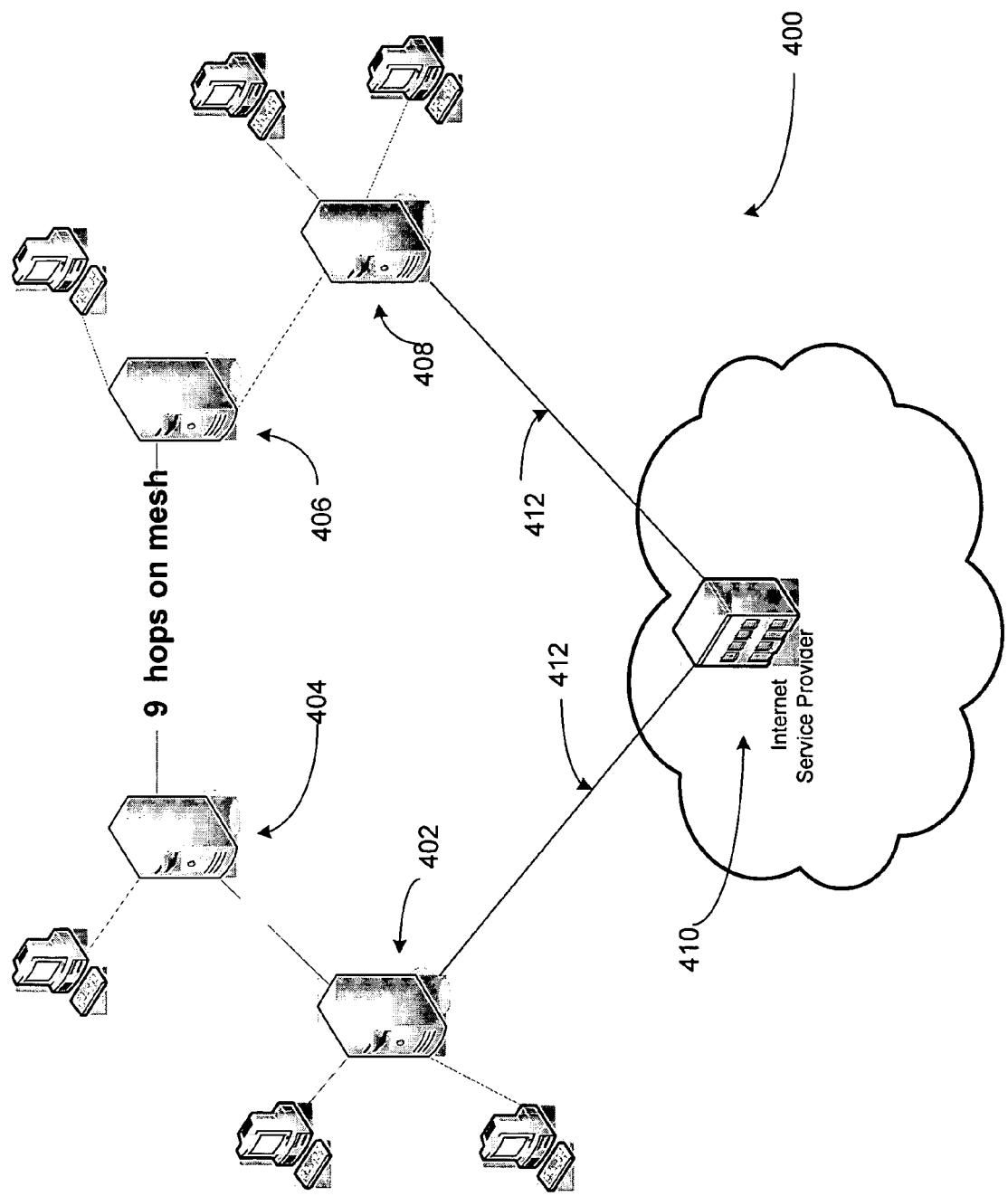
FIG. 4 illustrates an exemplary mesh network that may be used in one exemplary embodiment of the present invention.

FIG. 4 illustrates an exemplary mesh topology in which the range a data packet travels may be expanded. FIG. 4 illustrates but one topology of a mesh network. As stated above, the mesh network may have any topology without departing from the spirit and scope of the present invention. The mesh topology in FIG. 4 is for exemplary and explanatory purposes only and not for purposes of limiting the scope of the present invention as will be fully set forth in the claims below.

Mesh network 400 includes mesh nodes 402, 404, 406 and 408. Mesh nodes 402 and 408 are referred to herein as egress mesh nodes 402 and 408 in that they have Internet egress points through the Internet service provider 410. Mesh nodes 404 and 406 do not have Internet egress points and, therefore, are referred to herein as internal mesh nodes 404 and 406. In one embodiment, the connection 412 is a broadband connection. However, other types of connections are contemplated as set forth above.

Data packets exchanged between internal mesh node 406 and the Internet service provider 410 will likely traverse at least egress mesh node 408 depending on the routing protocol of the routing tables available to the internal mesh node 404. Likewise, data packets exchanged between internal mesh node 404 and the Internet service provider will likely traverse at least egress mesh node 402 depending on the routing protocol of the routing tables.

In the situation where internal mesh node 404 communicates with internal mesh node 406, a data packet must travel through eight intermediate mesh nodes. Stated another way, internal mesh node 404 is nine hops away from internal mesh node 406. As previously stated, latency increases proportionally to the number of hops between nodes. Furthermore, the mesh network 400 may have a topology where internal mesh node 404 and internal mesh node 406 are not connected on the mesh. Accordingly, the internal mesh nodes 404 and 406 may be inaccessible to one another (or have unreasonable conductivity), in part, because of a high number of hops a data packet must make between the two mesh nodes or the high latency between the mesh nodes. With at least these problems evident, the present invention contemplates an alternative path between two mesh nodes in a mesh network.

Typically, the connection 412 is used strictly for communication between the mesh network 400 and the Internet. However, as will be discussed further in conjunction with FIGS. 5 and 6, the connections 412 provide another path of conductivity that may be used in routing data packets between nodes of a mesh. A mesh node may take advantage of a path through the connection 412 if this path is made available by a routing table accessible to the mesh node. For example, instead of internal mesh node 404 routing data packets through nine hops to internal mesh node 406, the internal mesh node 404 may route the data packets using the connection media 412 in order to reduce the number of hops and/or latency between internal mesh nodes 404 and 406. A data packet routed in accordance with the present invention would only need to traverse egress mesh node 402, the Internet service provider and egress mesh node 408. Thus, the hop count between internal mesh node 404 and internal mesh node 406 is reduced from nine hops to four hops and latency is decreased between the mesh nodes. This routing may also apply where egress mesh node 402 and egress mesh node 408 communicate. In one embodiment, the data packet does not enter the Internet during routing. However, it is contemplated that the data packet could enter the Internet during routing and it is also contemplated that the data packet may be routed through two different Internet service providers before routing is complete.

Figure 5:
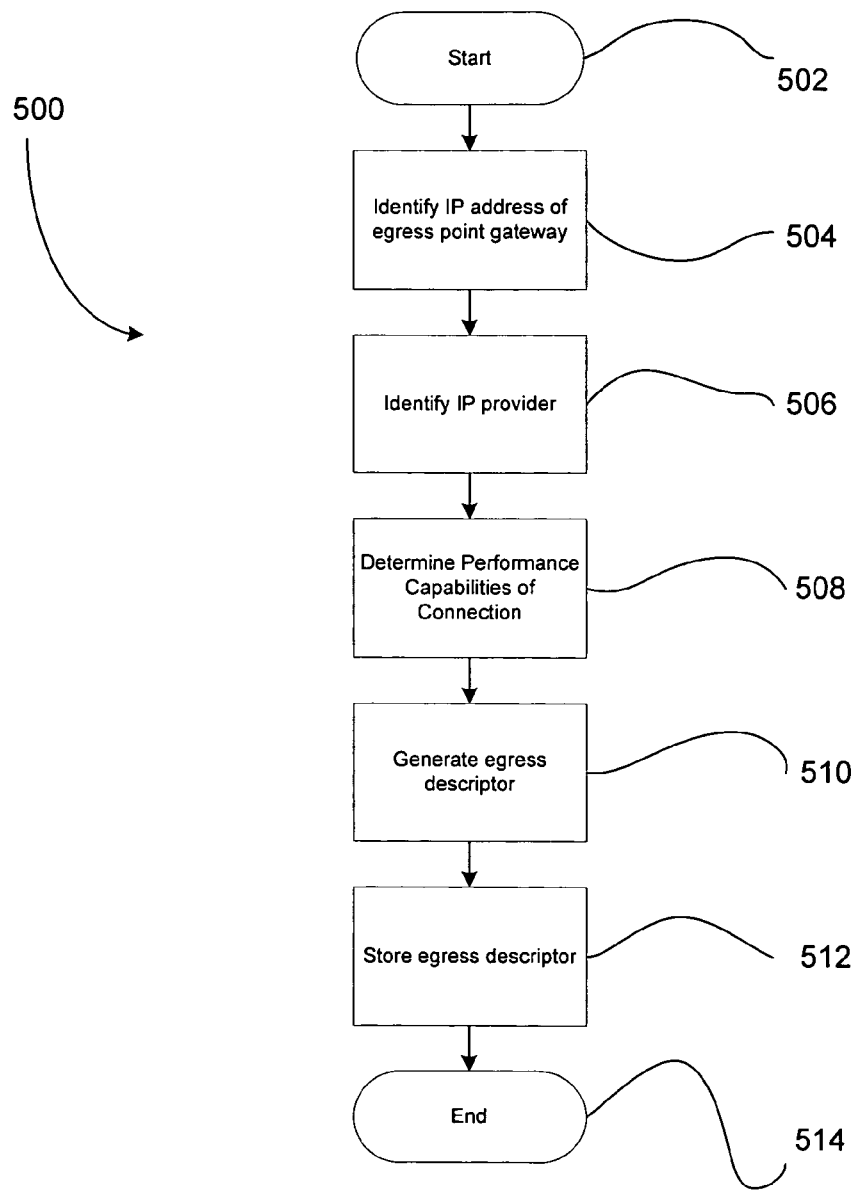
FIG. 5 illustrates a logical flow diagram of an exemplary process for generating a descriptor in accordance with the present invention.

In order to route data packets in the manner of one embodiment of the present invention, the path through the Internet service provider is published in a routing table that is accessible by mesh nodes on the mesh network. An egress mesh node makes the path through the Internet service provider accessible to other mesh nodes on the mesh network by providing a descriptor of its Internet egress point. FIG. 5 represents a logical flow diagram of a process for providing a descriptor to other mesh nodes on the mesh network.

The process 500 starts at starting block 502 and flows to block 504 where the Internet Protocol ("IP") address of the egress point gateway is identified. The process 500 continues to block 506 where Internet service provider is identified. Block 506 may include identifying the name of the Internet service provider. Although not necessary, the process 500 may also include a trace route in order to identify further characteristics between two mesh nodes. The process continues to block 508 where the performance capabilities of the Internet connection are determined. Such performance capabilities may include the uplink and downlink capability of the Internet connection. The performance capabilities may also include the current traffic volume, interference or load associated with the Internet egress point. An egress point descriptor is generated as indicated by block 510. The egress point descriptor includes the identified information of blocks 504-508. However, any information that is beneficial for a mesh node to access an Internet egress point may be included as a component of the descriptor. Also, the process 500 may include generating a plurality of egress descriptors.

The process 500 continues to block 512 where the descriptor is stored in a descriptor store. The descriptor store may comprise any type of storage so long as other mesh nodes have access to the descriptor. The descriptor may be available to nodes throughout the entire network or an expanded local region of the network. The descriptor is useful beyond the normal hop limit on the network because other egress mesh nodes will use the descriptor to setup more optimal routes, which will cause other egress mesh nodes to be within range. Insofar as egress mesh nodes are relatively static and long-lived, the propagation of egress point descriptors around the network is not necessarily time-critical and may be implemented as a low-priority background task.

Figure 6:
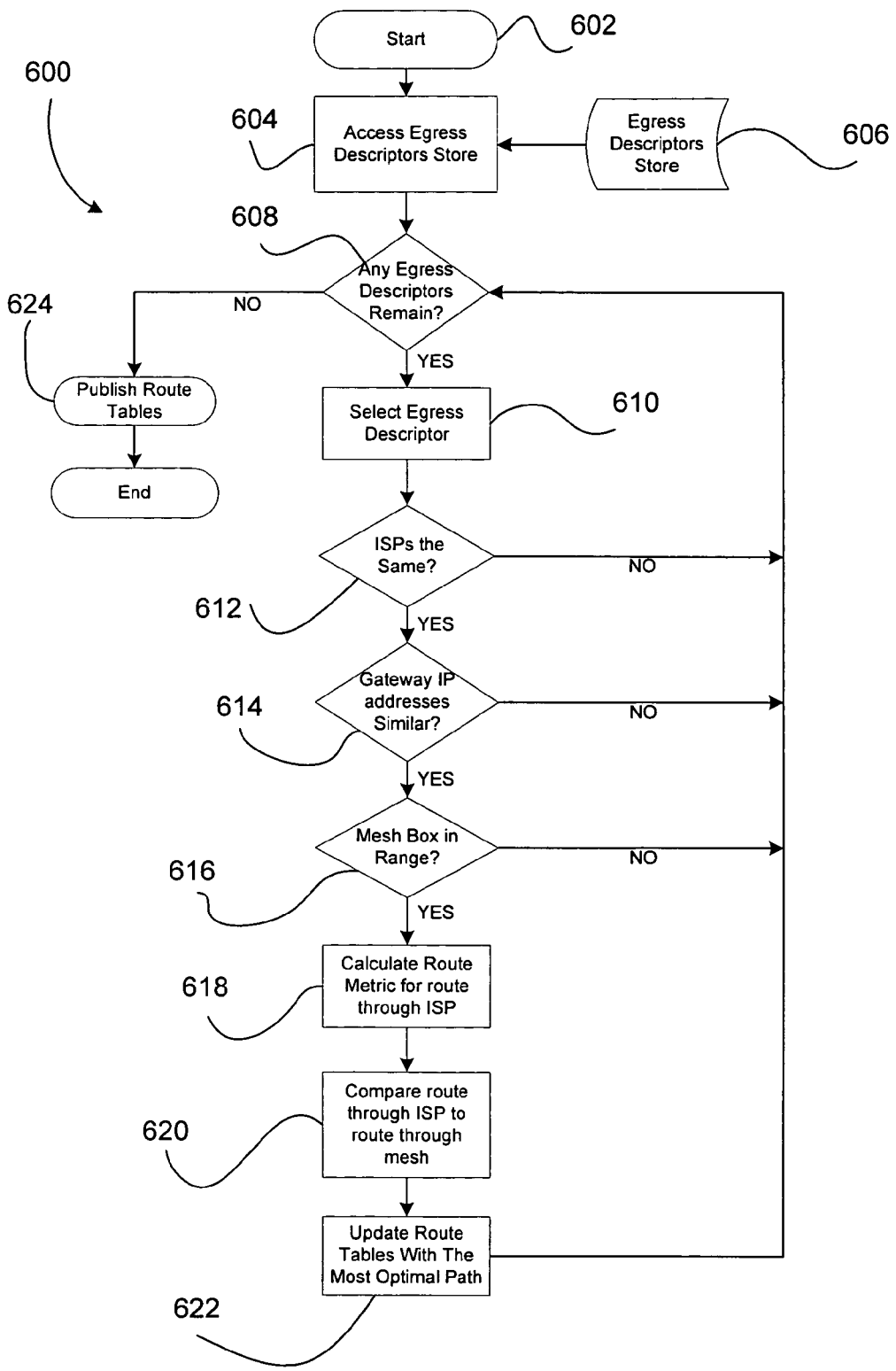
FIG. 6 illustrates a logical flow diagram of an exemplary process for expanding the range of a mesh network in accordance with the present invention.

FIG. 6 illustrates a logical flow diagram of a process for determining whether a route through a local Internet service provider is a more optimal path between two nodes. The process 600 may execute on egress mesh nodes. The process starts at block 602 and flows to block 604 where a mesh node accesses the egress descriptor from the descriptor store 606. The descriptor and the store 606 are described above in conjunction with FIG. 5. The egress mesh node determines if any descriptors remain for analysis, as is indication by block 608. In the situation where no descriptors are left for analysis, the process proceeds to block 624 where an available route table is published for use by mesh nodes having access to the route table. In the situation where descriptors remain in the store for analysis, the process continues to block 610 where the egress descriptor is selected.

Block 612 indicates the step of determining if the Internet service provider identified in the descriptor is the same as the provider of the egress mesh node that is performing the process 600. If the Internet service providers are not the same, the process loops back to block 608. In the situation where the Internet service providers are the same, the process continues to block 614.

Block 614 indicates the step of determining if the gateway IP address identified in the descriptor is similar to the gateway of the egress mesh node that is performing the process 600. An exact match does not need to exist. The gateway IP address must be similar to the extent that a data packet will use a common piece of equipment when communicating between two egress mesh nodes. Various Internet service providers use different routers, switches, etc. Accordingly, determining if the gateway IP address identified in the descriptor is similar to the egress mesh node that is connected to the mesh node performing the process 600, will depend on the configuration of the Internet service provider. The determination of a similar gateway IP address will depend, in part, on standard IP addressing and subnet rules and will be evident to those of skill in the art upon determination of the configuration of the Internet service provider. In the situation where the gateway IP addresses are not similar, the process 600 loops back to block 608 as stated above. Where the gateway IP addresses are similar, the process 600 continues to block 616.

Block 616 indicates the step of determining if the other egress mesh node identified in the descriptor is in range of the egress mesh node performing the process 600. The distance is measured over the Internet, not over the mesh network. A trace route is performed from the egress mesh node performing the process 600 to other egress mesh node identified in the descriptor. The trace route identifies the hop count and actual latency for the route. In the situation where the hop count and/or the latency is too high the process 600 proceeds to block 608 as stated above. Where the trace route indicates that the egress mesh node provided in the descriptor is in range (or is acceptable), the process 600 proceeds to block 618.

Block 618 indicates the step of calculating a route metric for a path through the Internet service provider. Generally, the route metric may be calculated in various ways depending on the routing protocol. The route metric may consider several factors in rating a path. One such factor may include the bandwidth of the connection media. Other factors may include the latency or hop count of a particular path. Other factors include the volume of traffic on a particular path. The route metric may include any factor that facilitates the identification of the optimal path through a mesh network.

In one embodiment, the route metric calculation takes advantage of the Mesh Connectivity Layer (MCL) protocol. MCL is an implementation of the Link Quality Source Routing (LQSR) algorithm. LQSR uses link quality measurements to calculate route metrics of available routes between mesh nodes. The packets are then sent along the route with the best metric. Other protocols are contemplated as long as the hops between the Internet egress points can be rated and included in the route determination. Once the egress routing metric has been calculated, the internal mesh node is given access to the egress routing metric and the routing metric is compared to other routes through the mesh network as indicated by block 620.

Block 622 indicates the step of updating the routing tables with the most optimal path. The process 600 then loops back to block 608 where it is determined if any descriptors remain. If descriptors remain, the process continues to block 610 as stated above. If descriptors do not remain the process 600 continues to block 624 where the routing table is published to allow mesh nodes access to the tables and the process 600 ends. The published routing tables may have a limited range of accessibility, because the route through the egress mesh node may only be useful when the egress mesh node is within range. This table may then be used by a mesh node to route data packets. In the situation where the most optimal path for routing is through an Internet service provider, the mesh nodes will use the connection media of the Internet service provider as a path for routing data packets.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for expanding a range of a mesh network by using an internet service provider to facilitate a hop during data packet routing, the system comprising:
   a processor; and
   a memory having computer executable instructions configured for:
      providing a first egress mesh node that is configured to communicate with an internet service provider and provide routing information for routing a data packet originating from an internal mesh node, wherein the first egress mesh node and the internal mesh node are located in a first portion of the mesh network;
      providing a second egress mesh node in a second portion of the mesh network, wherein the second egress mesh node is configured to communicate with the internet service provider;
      generating, at the first egress mesh node, an egress point descriptor, wherein the egress point descriptor indicates a route to utilize the internet service provider as a node in the mesh network to provide a first hop from the first egress mesh node to the internet service provider and to hop the data packet from the internet service provider to the second egress mesh node without entering the internet facilitated by the internet service provider, wherein the egress point descriptor includes,
         a name of an internet service provider,
         a gateway internet protocol address, and
         trace route information for hopping the data packet from the first egress mesh node to the internet service provider and for hopping the data packet from the internet service provider to the second egress mesh node;
      determining, at the first egress mesh node, whether the route indicated by the egress point descriptor is an optimal path for sending the data packet from the internal mesh node to the second egress mesh node by utilizing the internet service provider as a node of the mesh network, wherein determining whether the route indicted by the egress point descriptor is an optimal path for sending the data packet from the internal mesh node to the second egress mesh node by utilizing the internet service provider as a node of the mesh network includes,
         comparing the name of the internet service provider of the egress point descriptor with a name of an internet service provider in communication with the first egress mesh node,
         comparing the gateway internet protocol address of the egress point descriptor with a gateway internet protocol address of an internet service provider in communication with the first egress mesh node,
         determining whether the trace route information indicates an acceptable hop count and latency for hopping the data packet from the first egress mesh node to the internet service provider and for hopping the data packet from the internet service provider to the second egress mesh node,
      when the route indicated by the egress point descriptor is the optimal path,
         updating a routing table with the optimal path by indicating the internet service provider as a node of the mesh network,
         publishing the routing table for access by the internal mesh node,
         receiving, at the first egress mesh node, the data packet from the internal mesh node for routing according to the optimal path, and
         routing the data packet by hopping the data packet from the first egress mesh node to the internet service provider and by hopping the data packet from the internet service provider to the second egress mesh node without entering the Internet facilitated by the internet service provider.

2. The system of claim 1, wherein comparing the gateway internet protocol address of the egress point descriptor with a gateway internet protocol address of an internet service provider in communication with the first mesh node includes identifying internet protocol addressing rules and subnet rules of the internet service provider identified in the egress point descriptor.

3. The system of claim 1, wherein the egress point descriptor further includes an indication of performance capabilities.

4. The system of claim 3, wherein the performance capabilities includes at least one member of a group comprising: an indication of upload capabilities and an indication of download capabilities.

5. The system of claim 3, wherein the performance capabilities includes an indication of current traffic volume.

6. The system of claim 3, wherein the performance capabilities includes an indication of interference.

7. The system of claim 3, wherein the performance capabilities includes an indication of load.

8. A computer implemented method for expanding a range of a mesh network by using an internet service provider to facilitate a hop during data packet routing, the method comprising:
   providing a first egress mesh node that is configured to communicate with an internet service provider and provide routing information for routing a data packet originating from an internal mesh node, wherein the first egress mesh node and the internal mesh node are located in a first portion of the mesh network;
   providing a second egress mesh node in a second portion of the mesh network, wherein the second egress mesh node is configured to communicate with the internet service provider;
   generating, at the first egress mesh node, an egress point descriptor, wherein the egress point descriptor indicates a route to utilize the internet service provider as a node in the mesh network to provide a first hop from the first egress mesh node to the internet service provider and to hop the data packet from the internet service provider to the second egress mesh node without entering the internet facilitated by the internet service provider, wherein the egress point descriptor includes,
      a name of an internet service provider, a gateway internet protocol address, and trace route information for hopping the data packet from the first egress mesh node to the internet service provider and for hopping the data packet from the internet service provider to the second egress mesh node;

determining, at the first egress mesh node, whether the route indicated by the egress point descriptor is an optimal path for sending the data packet from the internal mesh node to the second egress mesh node by utilizing the internet service provider as a node of the mesh network, wherein determining whether the route indicted by the egress point descriptor is an optimal path for sending the data packet from the internal mesh node to the second egress mesh node by utilizing the internet service provider as a node of the mesh network includes, comparing the name of the internet service provider of the egress point descriptor with a name of an internet service provider in communication with the first egress mesh node, comparing the gateway internet protocol address of the egress point descriptor with a gateway internet protocol address of an internet service provider in communication with the first egress mesh node, determining whether the trace route information indicates an acceptable hop count and latency for hopping the data packet from the first egress mesh node to the internet service provider and for hopping the data packet from the internet service provider to the second egress mesh node, when the route indicated by the egress point descriptor is the optimal path, updating a routing table with the optimal path by indicating the internet service provider as a node of the mesh network, publishing the routing table for access by the internal mesh node, receiving, at the first egress mesh node, the data packet from the internal mesh node for routing according to the optimal path, and routing the data packet by hopping the data packet from the first egress mesh node to the internet service provider and by hopping the data packet from the internet service provider to the second egress mesh node without entering the Internet facilitated by the internet service provider.

9. The computer implemented method of claim 8, wherein comparing the gateway internet protocol address of the egress point descriptor with a gateway internet protocol address of an internet service provider in communication with the first mesh node includes identifying internet protocol addressing rules and subnet rules of the internet service provider identified in the egress point descriptor.

10. The computer implemented method of claim 8, wherein the egress point descriptor further includes an indication of performance capabilities.

11. The computer implemented method of claim 10, wherein the performance capabilities includes at least one member of a group comprising: an indication of upload capabilities and an indication of download capabilities.

12. The computer implemented method of claim 10, wherein the performance capabilities includes an indication of current traffic volume.

13. The computer implemented method of claim 10, wherein the performance capabilities includes an indication of interference.

14. The computer implemented method of claim 10, wherein the performance capabilities includes an indication of load.

15. A computer-readable storage medium having computer executable instructions for expanding a range of a mesh network by using an internet service provider to facilitate a hop during data packet routing, the instructions comprising:

providing a first egress mesh node that is configured to communicate with an internet service provider and provide routing information for routing a data packet originating from an internal mesh node, wherein the first egress mesh node and the internal mesh node are located in a first portion of the mesh network;

providing a second egress mesh node in a second portion of the mesh network, wherein the second egress mesh node is configured to communicate with the internet service provider;

generating, at the first egress mesh node, an egress point descriptor, wherein the egress point descriptor indicates a route to utilize the internet service provider as a node in the mesh network to provide a first hop from the first egress mesh node to the internet service provider and to hop the data packet from the internet service provider to the second egress mesh node without entering the internet facilitated by the internet service provider, wherein the egress point descriptor includes, a name of an internet service provider, a gateway internet protocol address, and trace route information for hopping the data packet from the first egress mesh node to the internet service provider and for hopping the data packet from the internet service provider to the second egress mesh node;

determining, at the first egress mesh node, whether the route indicated by the egress point descriptor is an optimal path for sending the data packet from the internal mesh node to the second egress mesh node by utilizing the internet service provider as a node of the mesh network, wherein determining whether the route indicted by the egress point descriptor is an optimal path for sending the data packet from the internal mesh node to the second egress mesh node by utilizing the internet service provider as a node of the mesh network includes, comparing the name of the internet service provider of the egress point descriptor with a name of an internet service provider in communication with the first egress mesh node, comparing the gateway internet protocol address of the egress point descriptor with a gateway internet protocol address of an internet service provider in communication with the first egress mesh node, determining whether the trace route information indicates an acceptable hop count and latency for hopping the data packet from the first egress mesh node to the internet service provider and for hopping the data packet from the internet service provider to the second egress mesh node, when the route indicated by the egress point descriptor is the optimal path, updating a routing table with the optimal path by indicating the internet service provider as a node of the mesh network, publishing the routing table for access by the internal mesh node, receiving, at the first egress mesh node, the data packet from the internal mesh node for routing according to the optimal path, and routing the data packet by hopping the data packet from the first egress mesh node to the internet service provider and by hopping the data packet from the internet service provider to the second egress mesh node without entering the Internet facilitated by the internet service provider.

16. The computer-readable storage medium of claim 15, wherein comparing the gateway internet protocol address of the egress point descriptor with a gateway internet protocol address of an internet service provider in communication with the first mesh node includes identifying internet protocol addressing rules and subnet rules of the internet service provider identified in the egress point descriptor.

17. The computer-readable storage medium of claim 15, wherein the egress point descriptor further includes an indication of performance capabilities.

18. The computer-readable storage medium of claim 17, wherein the performance capabilities includes at least one member of a group comprising: an indication of upload capabilities and an indication of download capabilities.

19. The computer-readable storage medium of claim 17, wherein the performance capabilities includes an indication of current traffic volume.

20. The computer-readable storage medium of claim 17, wherein the performance capabilities includes an indication of interference.

* * * * *